United States Patent
Li et al.

(10) Patent No.: US 11,312,020 B2
(45) Date of Patent: Apr. 26, 2022

(54) SYSTEM AND METHOD FOR FAST OBJECT DETECTION IN ROBOT PICKING

(71) Applicants: Beijing Jingdong Shangke Information Technology Co., Ltd., Beijing (CN); JD.com American Technologies Corporation, Mountain View, CA (US)

(72) Inventors: Xiang Li, Mountain View, CA (US); Peng Chang, Mountain View, CA (US); Hui Cheng, Mountain View, CA (US); Zhengmao Liu, Mountain View, CA (US)

(73) Assignees: BEIJING JINGDONG SHANGKE INFORMATION TECHNOLOGY CO, Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 233 days.

(21) Appl. No.: 16/197,021

(22) Filed: Nov. 20, 2018

(65) Prior Publication Data

US 2020/0156254 A1    May 21, 2020

(51) Int. Cl.
*B25J 9/16* (2006.01)
*G06T 7/62* (2017.01)
*G06V 10/20* (2022.01)

(52) U.S. Cl.
CPC .............. *B25J 9/1697* (2013.01); *G06T 7/62* (2017.01); *G06V 10/255* (2022.01)

(58) Field of Classification Search
CPC ......... B25J 9/1697; G06T 7/62; G06K 9/3241
See application file for complete search history.

(56) References Cited

U.S. PATENT DOCUMENTS

| | | | |
|---|---|---|---|
| 6,493,465 B2 * | 12/2002 | Mori | G06T 7/32 382/199 |
| 7,406,213 B2 * | 7/2008 | Hasegawa | H04N 1/407 348/36 |
| 9,317,771 B2 * | 4/2016 | Ejima | G06T 7/75 |
| 9,418,442 B2 * | 8/2016 | Reiter | A61B 34/20 |
| 9,746,855 B2 * | 8/2017 | Kobayashi | B25J 9/1697 |
| 9,842,399 B2 * | 12/2017 | Yamaguchi | G06T 7/97 |
| 10,805,546 B2 * | 10/2020 | Iida | G06T 7/0008 |
| 2019/0197727 A1 * | 6/2019 | Konishi | G06K 9/6202 |

* cited by examiner

*Primary Examiner* — Khoi H Tran
*Assistant Examiner* — Rodney P King
(74) *Attorney, Agent, or Firm* — Scully Scott Murphy & Presser

(57) ABSTRACT

A method and system for monitoring an e-commerce platform. The system includes a computing device and a visual sensor. The computing device includes a processor and a storage device storing computer executable code. The computer executable code, when executed at the processor, is configured to: extract image keypoints from an image of the object captured by the visual sensor; retrieve a template of the object, where the template includes template keypoints of at least one template side surface of the object; pick two template keypoints from the template side surface and determine two image keypoints respectively matching the two picked template keypoints; build a bounding box of the object based on the two determined image keypoints; and refine the bounding box.

17 Claims, 7 Drawing Sheets

(4 of 7 Drawing Sheet(s) Filed in Color)

SYSTEM AND METHOD FOR FAST OBJECT DETECTION IN ROBOT PICKING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to operation of robot picking, and more particularly to system and methods for fast object detection during robot picking of items from a robot bin.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Robot bin picking is an important application in warehouse automation. In a robot bin picking system, a computer vision system is needed to first locate the items having stock keeping unit (SKU) in the transport bin, and then send the location and pose of each SKU item to the robot controller, so that the robot arm can be guided to perform picking actions from the bin. However, it is a challenge to localize the SKU items fast and accurately.

Therefore, an unaddressed need exists in the art to address the aforementioned deficiencies and inadequacies.

SUMMARY

In certain aspects, the present disclosure relates to a system for determining a pose of a target object from a plurality of objects. In certain embodiments, the system includes a computing device and a visual sensor in communication with the computing device. The computing device has a processor and a storage device storing computer executable code. The computer executable code, when executed at the processor, is configured to:

extract image keypoints from an image, wherein the image is captured by the visual sensor on a region of interest, the region of interest comprises the plurality of objects, and each of the keypoints is defined with its location and feature descriptor;

retrieve a template of the target object, wherein the template comprises a plurality of template side surfaces, each of the template side surfaces is characterized with a plurality of template keypoints, and each of the template keypoints is defined with its location and feature descriptor;

match the image keypoints to the template keypoints in each of the template side surfaces;

select one of the template side surfaces based on a number of matches between the image keypoints and the template keypoints in the one of the template side surfaces;

pick two template keypoints from the selected template side surface and determine two image keypoints respectively matching the two picked template keypoints;

build a bounding box based on the two determined image keypoints, wherein the bounding box represents an image side surface corresponding to the selected template side surface of the template;

determine inlier keypoints, wherein the inlier keypoints are located inside the bounding box, and have matched template keypoints in the selected template side surface;

refine the bounding box using the inlier keypoints.

The pose of the target object is determined based on the refined bounding box.

In certain embodiments, the computer executable code is configured to define a mask to the objects in the image before extracting image keypoints.

In certain embodiments, the computer executable code is configured to perform the step of selecting one of the template side surfaces having a great number of matches and picking two template keypoints from the selected template side surface iteratively for a pre-determined number of times.

In certain embodiments, each of the template side surface is selected for a percentage of the pre-determined number of times, and the percentage is determined by a number of matched keypoints in the selected template side surface divided by a total number of matched keypoints in all the template side surfaces.

In certain embodiments, the two picked template keypoints are at least 5 pixels apart, and each of the two picked template keypoints has a match with one of the image keypoints.

In certain embodiments, the two template keypoints are selected randomly from the selected template side surface; the computer executable code is configured to perform the step of picking two template keypoints, determining two matched image keypoints, building the bounding box, determining inlier keypoints, and refining the bounding box iteratively; and each iteration results in a refined bounding box, each of the refined bounding boxes is characterized with a confidence value based on a number of inlier keypoints and a difference before and after the refinement, and the bounding box having a highest confidence value is used to determine the pose of the target object.

In certain embodiments, when the difference is defined as scale change between the bounding box and the side surface of the template, when a length of each side edge of the bounding box divided by a length of a corresponding side edge of the side surface of the template is out of a range of 0.8-1.25, the bounding box before the refinement is kept as the refined bounding box, and the confidence value of the refined bounding box is reduced.

In certain embodiments, the pose of the target object is provided to a robotic device for manipulating the target object.

In certain aspects, the present disclosure relates to a system for detecting an object. In certain embodiments, the system includes a computing device. The computing device has a processor and a storage device storing computer executable code. The computer executable code, when executed at the processor, is configured to:

provide image keypoints from an image of the object;

retrieve a template of the object, the template comprising template keypoints of at least one template side surface of the object;

pick two template keypoints from the template side surface and determine two image keypoints respectively matching the two picked template keypoints;

build a bounding box of the object based on the two determined image keypoints; and refine the bounding box to detect the object.

In certain embodiments, each of the image keypoints and the template keypoints is characterized by a location and descriptor.

In certain embodiments, the template of the object comprises a plurality of template side surfaces, and one of the template side surfaces having a great number of matched template keypoints and image keypoints is used for picking the two template keypoints from.

In certain embodiments, the two picked template keypoints are picked randomly and the computer executable code is configured to perform the step of picking iteratively for a pre-determined times.

In certain embodiments, the two picked template keypoints has a distance greater than a pre-determined distance, and each of the two picked template keypoints has a match with one of the image keypoints.

In certain embodiments, the image keypoints in the bounding box having match with the template keypoints in the template side surface are defined as inlier keypoints, and the bounding box is refined using the inlier keypoints.

In certain aspects, the present disclosure relates to a method for detecting an object. In certain embodiments, the method includes:

providing, by a computing device, image keypoints from an image of the object;

retrieving, by the computing device, a template of the object, the template comprising template keypoints of at least one template side surface of the object;

picking, by the computing device, two template keypoints from the template side surface and determining two image keypoints respectively matching the two picked template keypoints;

building a bounding box of the object based on the two determined image keypoints; and refining the bounding box to detect the object.

In certain embodiments, each of the image keypoints and the template keypoints is characterized by a location and descriptor.

In certain embodiments, the template of the object comprises a plurality of template side surfaces, and one of the template side surfaces having a great number of matched template keypoints and image keypoints is used for picking the two template keypoints from.

In certain embodiments, the two picked template keypoints are picked randomly, as long as the two picked template keypoints has a distance greater than a pre-determined distance and each of the two picked template keypoints has a match with one of the image keypoints.

In certain embodiments, the image keypoints in the bounding box having match with the template keypoints in the template side surface are defined as inlier keypoints, and the bounding box is refined using the inlier keypoints.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

The patent or application file contains at least one drawing executed in color. Copies of this patent or patent application publication with color drawing(s) will be provided by the Office upon request and payment of the necessary fee.

DETAILED DESCRIPTION

Figure 1:
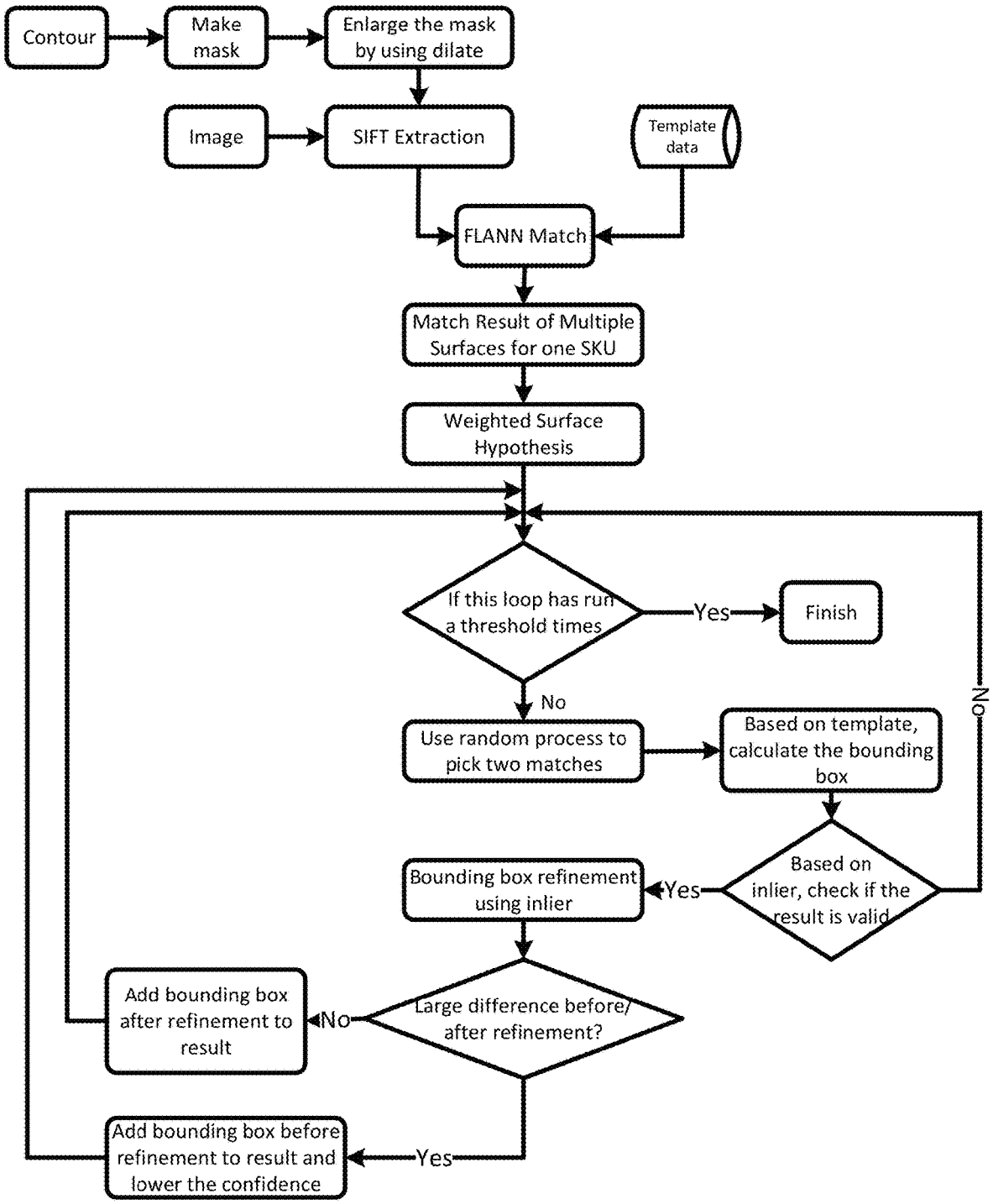
FIG. 1 schematically depicts a workflow of a fast object detection system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In a first example according to certain embodiments of the disclosure, a depth camera is used to locate the SKU items in a bin based on the three dimensional (3D) point cloud segmentation. This method works well if the SKU items are well separated in the 3D point cloud. However, if the items are tightly packed together, it is very difficult to separate them from the point cloud along. In certain embodiments, a red-green blue (RGB) image based method is needed to locate the objects in those situations.

In a second example according to certain embodiments of the disclosure, to locate the objects in RGB images, some systems use deep learning based methods, which usually require a large amount training data and long time to train and enroll a SKU item in the warehouse. In addition, there is no known deep learning based system which can achieve very high accuracy to date.

In certain aspects, as a novel improvement, the present disclosure provides systems and methods that can efficiently detect the location of the SKU items from the RGB images. In certain embodiments, the system and method use feature matching to locate the objects (SKUs) in the RGB image. Because a simple-minded feature matching can take very long time to compute, in certain embodiments, the disclosure designs a novel and fast matching to achieve high efficiency.

Compared to the first example, the system and method can work in tightly packed situations. Most of the time, the products in a transport bin or a shipping box are tightly packed, which means the system and method can have much wider using cases.

Compared to the second example, the system and method don't require large amount training data. The system and method require an enrolling process, and it is very fast (in minutes) compared to the training time for deep learning based methods (hours). In addition, our system and method can precisely detect the boundary of the objects in the image with high confidence, while deep learning solutions usually output approximate locations. What's more, to add some new SKUs into the machine learning solution takes lots of time and need an engineer who understands the machine learning to add new SKUs. Nowadays consumer goods update very fast, and a solution taking hours to add one new SKU is not desirable in warehouse automation.

The system and method according to the disclosure include two processes, the enrolling process and the detection process. In the enrolling process, the system records all the extracted image features for each side of the SKU item. For example, a SKU item with box shape has six sides (or side surfaces), and the system records all the image features for each side. The recorded image data and features for each side are referred as the template for the SKU item.

In the detection process, the objects/SKUs are detected and located from the RGB images by matching their image features to the features in the template. The feature matching process can be very time consuming given all the possible matches across all the features. In certain embodiments, it often requires four correctly matched point pairs to find a homography verified SKU. If we randomly pick four matches, the probability of all them are correct matches, coming from the same SKU, and matched to the same side in the template is very low, each feature from the test image can be matched to multiple features in the template, and vice versa. In addition, there are wrong matches. Therefore, a simple random sampling method is very inefficient. Most of the trials are wasted on matches picked from different objects, or matched to different sides of the template, or simply wrong matches. As an improvement, the system adopts a novel feature matching algorithm, which can locate multiple objects of different sides in the RGB image very efficiently. A key according to certain embodiments of the disclosure is that a minimum of two matched point pairs are needed to uniquely locate an object in the test image. It is called in the disclosure as a dual pair hereinafter. The novelty of the disclosure is to first rank the sides in the template to see which side has more possibility in the test image, and then select two matched keypoints from each side of the template according to the ranking, and then find the corresponding matched keypoints in the test RGB image. Since there can be multiple matches for each keypoint in the template, there can be multiple dual pairs. The system can solve for a bounding box for the SKU from each dual pair. The correct dual pair is then validated by further computing the number of inliers within the bounding box.

FIG. 1 schematically shows a work flow of a fast object detection system according to certain embodiments of the disclosure. As shown in FIG. 1, first, a contour is received for the region of interest. This input may be optional. The contour is transferred into a mask and then the mask is enlarged slightly using dilate. The slightly dilated mask provides more information without harming the purpose of the contour.

After that, using scale-invariant feature transform (SIFT) algorithm, the system extracts keypoints and their features of the region of interest from the image. Then, the system matches the keypoints and features from the image to the keypoints and features from the template data of the SKU item. In certain embodiments, the system uses fast approximate nearest neighbor search library (FLANN) matcher to match the keypoints and features from the image to that of each side of the SKU item from the template data. As a result, the match for multiple surfaces for one SKU item is provided.

Based on the number of matches on each different side, the system gets a hypothesis on which side has a bigger possibility to appear in the image. Specifically, for each side in the template, the system adds up the number of matches from the template to the query image. After the number of matches for all the possible sides of the SKU item is obtained, the system then calculates what is the percentage of the matches on one side with respect to matches on all the sides. When the percentage of the matches for each side is available, the system define a "slot" array of size 10 to distribute all sides into the account. Based on the percentage, the system decides how many times the index of the sides are put into the slot array. For example, if there is only two sides for this SKU, the first side has 72 matches and the second side has 28 matches, then in the slot array, there will be a "0" (stands for the first side) for 7 times and "1" (stands for the second side) for 3 times.

In this way, all the sides are considered according to their possibility of appearance in the query/test image. The reason to iterate more on sides with more matches is because if there are more matches, there should be more iterations to traverse all the possibilities. However, more iterations do not mean it is guaranteed to be detected. Thus, more matches towards one side will only give that side more iterations to try out the detection.

When the weight of the sides are provided in the slot array, the system makes a loop to iterate through some of the possibilities to find one side or side surface as the dominant side/most probable side. First, there is an iteration number limitation to exit the program. If the iteration limitation is met, it is believed that this SKU item is not in the region of interest now and the system finishes. If the iteration number is less than the limitation, the system continues to try one of the sides based on the side hypothesis.

During each iteration of the loop, when it is less than the iteration threshold number, the system randomly picks two keypoint from a side of the template. Each of the two keypoints has at least one matched point on the image. The two keypoints have a minimum separation between them, because if two keypoints are too close, results may get inaccurate. In certain embodiments, the two keypoints should be more than 5 pixels apart.

A keypoint from the template and its matched image keypoint from the image form a pair, and because each keypoint may have several matches, there may be more than one pairs for each keypoint. The system traverses all these pairs and filter out those whose image keypoints distance in the image has large difference from the keypoint distance in the template. For the remaining pairs, the system calculates the bounding box of the product on the query image based on the template information. By calculating the bounding box, the system obtains a transformation matrix between the query image and the template. After that, the system find out all the matches between the keypoints on the side of the template and their query image keypoints laying in the bounding box. For all those matches, the system uses the transformation matrix to calculate where they are in the template image. If the transformed position is within a certain small range of the corresponding keypoints in the template, the system considers this match as an inlier. If this pair of match has over a certain amount of inlier rate, it will be considered as one of the results in this region of interest.

For all the results generated, they all need to be refined because the two matches can only decide the bounding box up to similarity transform. A final refinement which calculates a homography using all the inliers will refine the bounding box. If the bounding box after refinement has a big difference with the bounding box before refinement, the system uses the bounding box before refinement and lower the confidence. Homography scale on X and Y axis are also checked.

Moreover, because the program is highly parallelizable for the loop, it is written in multi-thread.

Last but not least, the system will also check if the result is unique by calculating if there is another result that has a huge overlay over the current result. If there is no huge overlay between the another result and the current result, the system will keep the one with higher confidence.

In certain embodiments, the work flow of the real time object detection and the preparation of the product template are two independent processes, and preferably the product template are prepared and stored in a database in advance. In certain embodiments, the real time object detection and the template preparation may also be performed in parallel or at substantially the same time, as long as the product template is available when the real time object detection requires the template.

Figure 2:
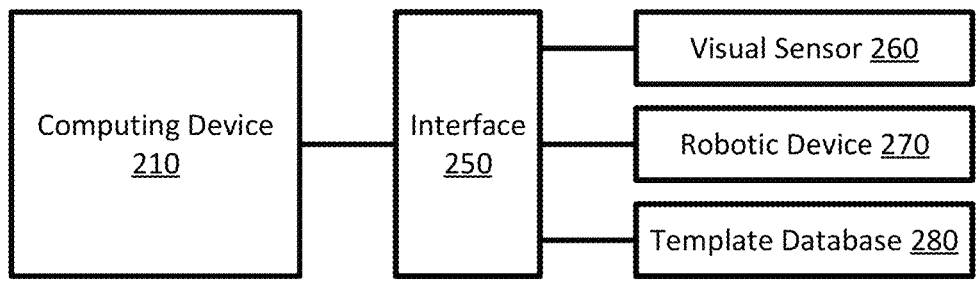
FIG. 2 schematically depicts a fast object detection system according to certain embodiments of the present disclosure.

FIG. 2 schematically depicts a fast object detection system for robot picking according to certain embodiments of the present disclosure. As shown in FIG. 2, the system 200 includes a computing device 210, a visual sensor 260, a robotic device 270, a template database 280, and one or more interfaces 250 connecting the computing device 210 with the visual sensor 260, the robotic device 270, and the template database 280.

The computing device 210 may be a server computer, a general-purpose computer, a cloud computer, a cluster, a tablet, a headless computer, or a specialized computer, which provides object detection service.

In certain embodiments, the interface 250 may be physical hardware interface such as electrical connectors, buses, ports, cables, terminals, or other I/O devices. One of ordinary skill in the art would appreciate that the configuration of the baseboard may be adjusted or changed according to the necessary design or manufacturing requirements. In certain embodiments, the interface 250 may be a network. The network may be a wired or wireless network, and may be of various forms, such as a public network and a private network. Examples of the network may include, but not limited to, the LAN or a wide area network (WAN) including the Internet. In certain embodiments, two or more different networks and/or interfaces may be applied to connect the computing device 210 to the visual sensor 260, robotic device 270, and the template database 280.

The visual sensor 260 may be connected to the computing device 210 via the interface 250, or is an integrated part of the computing device 210. The visual sensor 260 is configured to capture images or video of a region of interest, such as an area having a bin with SKU item contained therein. In certain embodiments, the visual sensor 260 is an RGBD camera. The RGBD camera 260 captures RGB images and depth images. The RGB images and the depth images may be saved separately or saved together The robotic device 270 is configured to operate, such as pick up items in the SKU item bin according to instructions. In certain embodiments, the visual sensor 260 may be an integrated part of the computing device 210 or the robotic device 270. In certain embodiments, the computing device 210, the visual sensor 260 and the robotic device 210 are all integrated together.

The template database 280 is configured to store information of SKU items, such as keypoints and features from the sides of the SKU items. The template database 280 may be stored in warehouse server registering information of the items, or may be stored in a cloud, or may be stored inside the computing device 210. The keypoints and features of the sides of the SKU items stored in the template database 280 is accessible by the computing device 210.

Figure 3:
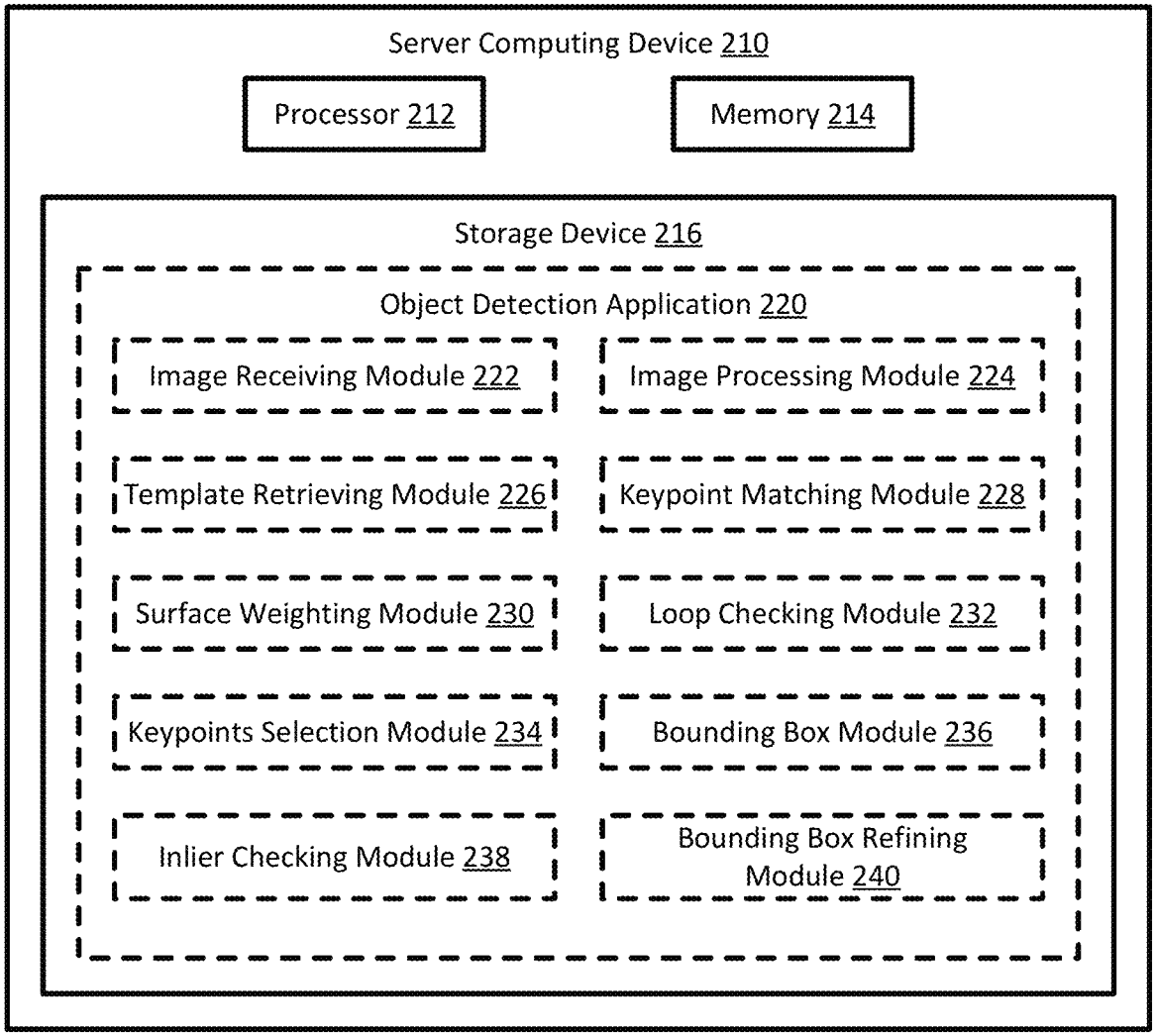
FIG. 3 schematically depicts a server computing device according to certain embodiments of the present disclosure.

FIG. 3 schematically shows the structure of the computing device 210 according to certain embodiments of the present disclosure. As shown in FIG. 3, the computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the computing device 210. The processor 212 can execute an operating system (OS) or other applications of the computing device 210. In some embodiments, the computing device 210 may have more than one CPU as the processor, such as two CPUs, four CPUs, eight CPUs, or any suitable number of CPUs. The memory 214 can be a volatile memory, such as the random-access memory (RAM), for storing the data and information during the operation of the computing device 210. In certain embodiments, the memory 214 may be a volatile memory array. In certain embodiments, the computing device 210 may run on more than one memory 214. The storage device 216 is a non-volatile data storage media for storing the OS (not shown) and other applications of the computing device 210. Examples of the storage device 216 may include non-volatile memory such as flash memory, memory cards, USB drives, hard drives, floppy disks, optical drives, solid-state drive (SSD), or any other types of data storage devices. In certain embodiments, the storage device 216 may be a local storage, a remote storage, or a cloud storage. In certain embodiments, the computing device 210 may have multiple storage devices 216, which may be identical storage devices or different types of storage devices, and the applications of the computing device 210 may be stored in one or more of the storage devices 216 of the computing device 210. As shown in FIG. 3, the storage device 216 includes an object detection application 220. The object detection application 220 provides a service for detect pose of SKU items in a bin, so that the robotic device 270 can pick up the SKU items accurately and efficiently.

The object detection application 220 includes, among other things, an image receiving module 222, an image processing module 224, a template retrieving module 226, a keypoint matching module 228, a surface weighting module 230, a loop checking module 232, a keypoints selection module 234, a bounding box module 236, an inlier checking module 238, and a bounding box refining module 240. In certain embodiments, the object detection application 220 may include other applications or modules necessary for the operation of the modules 222-240. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the object detection module 220 may be located at a remote computing device or a cloud device.

The image receiving module 222 is configured to receive or retrieve an image of the region of interest, and send the image to the image processing module 224. The image receiving module 222 may receive the image from the visual sensor 260 or instruct the visual sensor 260 to capture an image. In certain embodiments, the image received is an RGBD image, which includes a red channel, a green channel, a blue channel and a depth channel. The RGBD image may be one image file including all four channels, or may be separated RGB image file and depth image file, where the RGB image and the depth image may correspond to each other pixel by pixel.

The image processing module 224 is configured to, in response to receiving the image, process the image to obtain keypoints and features of the region of interest on the image, and send the keypoint and features to the keypoint matching module 228. In certain embodiments, the received image may include both an RGBD image and an RGB image, which correspond to each other pixel to pixel. The image processing module 224 is configured to detect the region of interest in the depth image. The objects in the image has certain height above bottom surface of the bin, and using the depth information of point cloud and image segmentation, the depth image of the objects in the bin is further confined in a smaller area. Then the image processing module 224 projects the smaller area to the 2D RGB image and forms a contour, where the objects are enclosed in the contour area. By this contour configuration, the following image processing is confined in the contour area, and makes the object detection process fast and accurate. All the image processing after obtaining the contour based on the 3D image is then performed on 2D image only. In certain embodiments, the contour determination based on the 3D image may not be necessary, and all the processes of the present disclosure can be performed on the 2D image only, and performed on a larger area including the whole bin.

The image processing module 224 is configured to, after obtaining the contour, transfer the contour into a mask, and finally dilate the mask slightly. In certain embodiments, the dilation of the mask is performed by extending the mask outwardly for 10-20 pixels, so as to make sure the objects are included in the dilated mask. By using the mask or the dilated mask, the image portions of the objects are included, while a significant portion of the area such as the bin is excluded from the following process. With the dilated mask and the RGB image available, the image processing module 224 is further configured to process the dilated mask and the RGB image using scale-invariant feature transform (SIFT), to extract keypoints and features from a part of the RGB image that is within the range of the dilated mask. Further, each keypoint is calculated with a feature, such as a feature descriptor. The image may include multiple SKU items, and the keypoints and features for each SKU items are identified based on the image when possible. The keypoints are spatial locations or points in the image that define what is interesting or what stand out in the image. The same keypoints normally can be identified in different images of the same objects, even if some of the images may be subjected to rotation, translation, shrinking/expansion, or distortion. In certain embodiments, each keypoint is defined by its location (x, y) or location with scale, orientation, and a feature descriptor vector calculated based on neighboring pixels of the keypoint.

The template retrieving module 226 is configured to retrieve template data of the SKU items in the bin and send the data to the keypoint matching module 228. When the SKU items are picked up and placed in the bin by a machine such a robotic device, the machine has the identification of those SKU items, and the information of those SKU items thus can be obtained from related databases. The template retrieving module 226 is configured to retrieve template information of the SKU items based on the identification of the SKU items. The template includes the sides of the SKU items, and the keypoints and features of each side of the SKU items. The template information of the SKU items are prepared in advance and stored in the related database, which may be captured using a product registration platform equipped with high resolution visual sensors, or provided by merchants. In certain embodiments, the keypoints and the features of each side of the SKU items are extracted using SIFT from the high resolution image of each side. In certain embodiments, the types of SKU in the bin or image is one or more, and a number of each type of the SKU is one or more. In an example, if there are tree type of SKU items and the total number of the three type of SKU items is ten, and the template for the three type of SKU items are retrieved based on the identification of the items.

The keypoint matching module 228 is configured to, in response to receiving the keypoints and features in the image from the image processing module 224 and the keypoints and features from the template retrieving module 226, match the keypoints and features of the SKU item in the image to the keypoint and features in each side of the SKU item template, and send the matched result to the surface weighting module 230. In certain embodiments, the keypoint matching module 228 is configured to perform the matching using FLANN Matcher. For each keypoint in the image, there may be zero, one or more matches in different sides of the template, and for each keypoint of the template, there may be zero, one or more matches in the image.

The surface weighting module 230 is configured to, upon receiving the match result, determine the number of matches for each side of the template, determine a weight based on the numbers, and send the weight to the loop checking module 232. For an SKU item, such as a toothpaste packaged in a cuboid, the SKU item template includes six sides (or side surfaces, or surfaces), and each side is characterized with its own keypoints and features. When the toothpaste package is placed in the bin and the visual sensor 260 takes a picture or image of the bin (region of interest), the image may include one, two, or three side surfaces of the toothpaste package. Further, the exposure of different sides of the packages in the image is different. Thus, the matched number of points for different sides vary.

The surface weighting module 230 is configured to, after matching and counting the number of matched keypoints and features for each template side, calculate a percentage of matches for each side with regard to all the matches, and determines a weight for each template side surface. In certain embodiments, the weight is placed in an array of size 10 to distribute all sides into account. Table 1 shows an example of a slot array according to certain embodiments of the present disclosure. In this example, an SKU item has six sides. 100 matches are found, where a first template side surface of the SKU item has 72 matches to the image, a second template side surface of the SKU item has 28 matches, and there is not match for the third to sixth template side surfaces. As shown in Table 1, the first to sixth rows corresponding to the first to sixth template side surfaces of the SKU item, where 0-5 in the left column represents the 6 side surfaces of the SKU item. In the right column, the total number of matches are defined as 10, and the weight for each side surface is calculated based on the number of matches in the side relative to the total number. For the first side surface, the weight is $10 \times \{72 \div (72+28)\} \approx 7$, and for the second side surface, the number is $10 \times \{28 \pm (72+28)\} \approx 3$. Kindly note Table 1 can be in other type of format, as long as the number of matches for all the template side is considered. In certain embodiments, the information may not be in the form of the Table, as long as the weight for each side surfaces are recorded based on the percentage of matches for each template side surfaces.

TABLE 1

Weight for the template side surfaces of a cuboid toothpaste package.

| | |
|---|---|
| 0 | 7 |
| 1 | 3 |
| 2 | 0 |
| 3 | 0 |
| 4 | 0 |
| 5 | 0 |

The loop checking module 232, upon receiving the weight for the side surfaces of the template, start the first looping process of refining bounding boxes, or in response to receiving a result of a bounding box refinement loop, check whether the threshold times of the loop has been performed. For example, give a weigh of surfaces of Table 1, the threshold is set to one million times. Of them, seventy percent of the one million loop process are performed on the first side surface, thirty percent of the one million loop process are performed on the second side surface, and no looping is performed on the other side surfaces of the template. When the loop checking module 232 checks that all the loop process have been performed, the loop checking module 232 finishes the loop, calculates the pose of the SKU item and provide the pose of the SKU item to the robotic device 270. In certain embodiments, the pose is the surface normal of the top surface of the detected SKU. The pose can be computed from the 3D depth image, given the detected image location. When the loop checking module 232 checks that the threshold number of loop processes have not been completely performed, it initialize a new loop iteration by instructing the operation of the keypoints selection module 234 again, the instruction includes on which side surface of the template to perform the process, based on the surface weight table such as Table 1. The side surface of the template is called a target side surface of the iteration.

In certain embodiments, the threshold for the number of loops to be performed includes several criteria, and each criterion result in existence of the loop. (1) Firstly, there is a hard threshold for no more than one million iterations. The program seldom reaches this criterion, though. It is more for a safe check to avoid infinite iterations. In certain embodiments, this hard threshold may be varied based on the object detection situation. (2) Secondly, there is another complicated threshold. In certain embodiments, the method according to the disclosure randomly takes two keypoints (keypoint pair) from a side of the template (each keypoint has at least one match to the query image and they are apart for at least 5 pixels). After that, the method finds out all the keypoint pair combinations in the query image to take consideration. Please note that one keypoint in the template can be matched to several keypoints in the query image. Therefore, for each pair of keypoints in the template, there can be several combinations of keypoint pairs in the query image. The system uses a distance ratio to eliminate incorrect keypoint pairs in the query image, by computing the ratio of the distances between the two keypoints of each pair. If the ratio is within 0.75 to 1.5, the method considers it a valid keypoint pair and continue the process, otherwise the method count it as a wrong keypoint pair. If the number of wrong keypoint pairs reaches ten thousands, the method stops loop, and restart by picking two different keypoints from the template. In certain embodiments, the ratio of 0.75 to 1.5 is defined when the SKU template is computed at the similar distance of the bin. If not, the ratio may be changed accordingly to reflect the differences. (3) Thirdly, a threshold is usually used in the situation when detections are found. In the loop, if a candidate passes all the criteria, the method registers it as a detection. When there are over 50 detections, the method will stop the loop. Please notice that these 50 detections can be repetitive, i.e. they can be detections to the same object in the image. After the loop, the method will refine the results: eliminate the same detections; refine the position of the bounding box etc. By processing this way, we can take the best result among all the similar ones, resulting in more accurate detection.

In other words, the loop checking module 232 checks the total number of loops performed, and if the number is greater than a hard threshold such as one million, the method finishes the loop; further the loop checking module 232 checks the total number of refined bounding boxes, and if the total number of refined bounding boxes is greater than a threshold, such as 50, the method finishes the loop; and the loop checking module 232 further records the number of the wrong two template keypoints/two matched image keypoints pairs, and if the number is greater than 1000, the method stops the loop. In certain embodiments, the number of 1000 may vary.

The keypoints selection module 234 is configured to, upon receiving the instruction from the loop checking module 232 that a new loop iteration is needed, randomly select two keypoints from the specific target side surface of the template. Further, the selection of the two keypoints is not completely random. For example, first, the distance between the two keypoints should be greater than a pre-determined distance; second, each of the two keypoints should have at least one matched keypoints in the image. In certain embodiments, the pre-determined distance is in a range of 3-30 pixels. In one embodiment, the two selected keypoints have to be at least five pixels apart from each other. When they are too close, the keypoints selection module 234 will just randomly choose another two. In certain embodiments, the keypoints selection module 234 will try about thirty times for a pair that their distances are larger than five pixels. If it fails, this iteration of this surface will be stopped.

In practice, after the matching by the keypoint matching module 228, the link between the matched image keypoints and the matched template keypoints are stored, and selection can be performed using the stored template keypoints that having the matched link. After selection, the result includes two pair of matched keypoints, for example, keypoint 1 from the template-keypoint 1 from the image & keypoint 2 from the template-keypoint 2 from the image. The keypoints 1 and 2 in the template are located in the same side or side surface. In certain embodiments, the keypoint 1 or keypoint 2 may have several matched points, and multiple two-pair keypoint matches may be defined, and then the multiple two-pair keypoint matches are filtered to find the one that meets the specified criteria. Each two-pair of matches, including two keypoints from the template and matched two keypoints from the image, are named two-pair keypoint matches.

As described above, one keypoint in the template may have several matched keypoints in the query image. Therefore, for each pair of keypoints in the template, there can be several combinations of keypoint pairs in the query image. The key point selection module 234 is configured to use a distance ratio to eliminate incorrect keypoint pairs in the query image, by computing the ratio of the distances between the two keypoints of each pair. If the ratio between the distance of the two matched keypoints in the image and the distance of the two selected keypoints in the template is within 0.75 to 1.5, the keypoint selection module 234 considers it a valid keypoint pair and continue the process, otherwise the keypoint selection module 234 count it as a wrong keypoint pair. In certain embodiments, the ratio may be defined depending on the situation, which could be, for example, 0.75-4.33 or other ranges, as long as it reflects the similarity between the two distances. If the number of wrong keypoint pairs reaches ten thousand, the method stops the loop.

The keypoint selection module 234 is further configured to, after removing the unqualified selection of keypoints pairs, send the two-pair keypoint matches to the bounding box module 236.

The bounding box module 236 is configured to, upon receiving one or more two-pair keypoint matches, determine a bounding box, and send the bounding box to the inlier checking module 238. The two-pair keypoint matches include two keypoints in the template and two matched keypoints in the image, and a bounding box is calculated using the two keypoints in the image based on the template. In certain embodiments, the two template keypoints and corners of the template side are available. Based on that information, for the two keypoints in the image, the four corner points in that image side can be estimated. The four estimated corner points in the image define the bounding box. The bounding box is ideally the side of the SKU item in the image that corresponds to the side of the SKU item in the template. During the calculation of the bounding box, a transformation matrix between the query image and the side of the template is obtained.

The inlier checking module 238, upon receiving each of the bounding boxes and its transformation matrix, find out the query image keypoints in the bounding box that have match in the template side, determine the inliers, and send each bounding box with the inliers to the bounding box refining module 240.

In certain embodiments, for each of the keypoint in the bounding box, the inlier checking module 238 checks whether the keypoints in the bounding box have at least one matched keypoint in the side of the template. When there are matches, the inlier checking module 238 projects locations of those keypoints in the bounding box to the side of the template. The position may be the same or close to the position of the corresponding matched template keypoint, or away from the position. Then for each keypoint in the bounding box in the query image, the inlier checking module 238 compares the position of the matched keypoint in the template and the position of the calculated keypoint in the template. When the difference between the two positions are small, the keypoint in the query image is defined as an inlier. In certain embodiments, for each keypoint, if the distance between the projected location and the matched feature location is within 3-20 pixels, the system consider it as an inlier. In certain embodiments, the criteria for the distance is within 5 pixels. Otherwise, it is an outlier. In this way, the system can obtain an inlier rate. In addition, to be considered a valid detection, there should be at least 15-60 (preferably 30) keypoints in the template that have matches in the bounding box, and there should be at least 10-30 (preferably 1:5) inliers (keypoints), and the overall inlier rate should be larger than 40%-80% (preferably 60%).

The bounding box refining module 240 is configured to, upon receiving each bounding box and the inliers, refine the bounding box using the inliers. In certain embodiments, the refinement is performed by calculating a homography using all the inliers. If the bounding box after refinement does not has a correct scale, the bounding box refining module 240 uses the one before refinement and lower the confidence. The scale is determined as follows: the bounding box refining module 240 divides respectively the lengths of all four side edges of the bounding box by the lengths of the corresponding four side edges of the side surface of the template, to obtain a scale change for each side edges of the side surface; then the bounding box refining module 240 checks the four scales to see if any scale is out of range. In certain embodiments, the valid scale range is from 0.6 to 1.5, and in certain embodiments, the valid scale range is from 0.8 to 1.25. If there is any out of range scales, the bounding box is considered as having a wrong scale, and the previous bounding box is kept, and is confidence is lowered. The confidence is calculated by inlier rate plus some offset. The inlier rate is calculated by the number of inlier keypoints in bounding box divided by the number of keypoints in the bounding box that has one match to template. The offset comes from how far the bounding box is out of the image boundary. For example, if one of the keypoint in the bounding box is about 40 pixel or greater away from the image boundary, it is abandoned; if one of the keypoint in the bounding box is 30 pixel away, the confidence get a 20%; if there is one 20 pixels away, it gets a −10%.

In certain embodiments, the bounding box refining module 240 receives multiple bounding boxes from the inlier checking module 238, and the bounding box refining module 240 performs the refinement of the bounding boxes in different thread, so as to make the refinement process efficient. In certain embodiments, the bounding box refining module 240 may also compare the refined bounding box to the other refined bounding boxes, and if there are huge overlap between two refined bounding boxes, the bounding box refining module 240 keeps only one bounding boxes from the two overlapped bounding boxes which has a higher confidence.

The bounding box refinement module 240 is further configured to send the refined bounding boxes to the loop checking module 232. When the loop checking module 232 determines that the iteration threshold is met, it selects one of the bounding boxes as the final result based on the quality of the bounding boxes, and finishes the application. In certain embodiments, the bounding box is selected based on the confidence. In certain embodiments, the selection of one bounding box is performed by comparing the confidence value of the bounding boxes and choosing the one with the highest confidence value. In certain embodiments, the loop checking module 232 further calculate the pose of the object based on the bounding box and the depth image.

Figure 4:
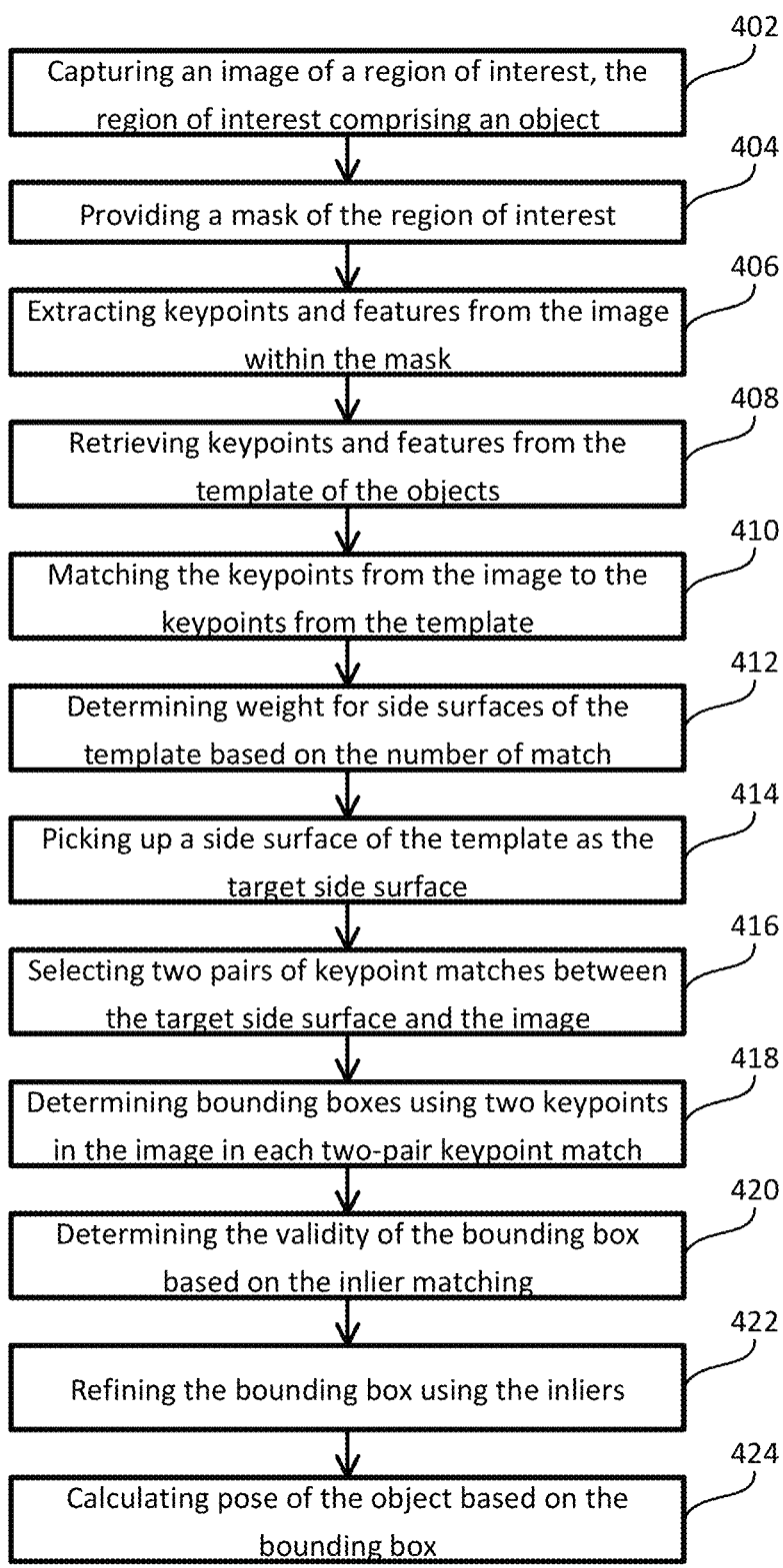
FIG. 4 schematically depicts a method for detecting object according to certain embodiments of the present disclosure.

FIG. 4 schematically shows a method of detecting an object according to certain embodiments of the present disclosure. In certain embodiments, the method is implemented by the computing device 210 shown in FIG. 2. It should be particularly noted that, unless otherwise stated in the present disclosure, the steps of the method may be arranged in a different sequential order, and are thus not limited to the sequential order as shown in FIG. 4.

At procedure 402, the visual sensor 260 captures an image of a region of interest, and send the captured image to the image processing module 224. The region of interest may be a bin, which includes one or more objects inside the bin. Accordingly, the image may show one or more objects. In certain embodiments, the image may include both an RGB image and a depth image, or an RGBD image.

At procedure 404, in response to receiving the image, the image processing module 224 obtains a contour derived for the region of interest from the depth image, projects the 3D contour in the depth image to a 2D contour, convert the contour to a mask, and dilate the mask to enlarge it slightly. The enlarge of the mask may be performed by including 10-20 pixels more from the edge of the original mask. In certain embodiments, the visual sensor 260 may capture RGB images only, and the method may not include the procedure 404. In certain embodiments, after obtains the mask, all the processes following that are performed on the RGB image only.

At procedure 406, the image processing module 224 extracts keypoints and features from the image using the mask and the RGB image. In certain embodiments, the image processing module 224 performs the extraction of keypoints and features from the image using SIFT. In certain embodiments, the extraction is performed on the pixels of the image within the dilated mask. After extraction, the image processing module 224 sends the extracted keypoints and features of the image to the keypoint matching module 228.

At procedure 408, the template retrieving module 226 retrieves template of the objects in the bin. In certain embodiments, each object has an SKU identification, and the objects are called SKU items. The objects or the SKU items, when being placed into the bin, is recorded with their identification and is sent to the template retrieving module 226. The template retrieving module 226, upon receiving the recorded identification, retrieves template from a template database. The template database may be a part of a warehouse database or a product management database, which stores the identification of the objects, sides (side surfaces) of each object, and keypoints and features in each sides of the objects. In certain embodiments, the template is prepared using high resolution images of the objects and SIFT. After retrieving the keypoints and feature information of the side surfaces of the objects, the template retrieving module 226 then sends the information to the keypoint matching module 228.

At procedure 410, upon receiving the keypoints and features from the image processing module 224 and the keypoints and features of the side surfaces of the objects, the keypoint matching module 228 matches the keypoints and features from the image to that of the template. In certain embodiments, the keypoint matching module 228 performs the matching using FLANK Matcher. For each side of the SKU item template, there may be no match or multiple matches of the keypoints and features. After matching, the keypoint matching module 228 sends the match result to the surface weighting module 230.

At procedure 412, upon receiving the match result between the image and the template, the surface weighting module 230 determines a weight for each side of the template, and sends the weight to the loop checking module 232. Specifically, when matching the keypoints and features from the image to each of the side surfaces of the template, the numbers of matches vary from one side surface to another. The surface weighting module 230 calculates the number of matches between the keypoints in the image and the keypoints in each side surface of the template, and then calculate a weight based on the number of matches. For example, if a template have six sides or side surfaces, and the match from the image to the first and second side surfaces of the template are respectively 72 and 28, and no match is found for the other four side surfaces, the weight is calculated based on 72 and 28, the weight can be set to seven and three respectively for the first and second side surfaces. Which means that the following iterations are performed 70% percent of times using the first side surface and 30% percent of times using the second side surface of the template.

At procedure 414, upon receiving the weight for the side surfaces of the template, the loop checking module 232 starts the first loop of bounding box determination based on the weight. The loop checking module 232 first picks a side surface as the target, which could be the first side surface (70% of the total number of loops) and the second side surface (30% percent of the total number of loops) based on the above described weight example. The pick of the target side surface may be randomly performed. After picking the target side surface, the loop checking module 232 sends the pick to the keypoint selection module 234.

At procedure 416, upon receiving the target side surface from the loop checking module 232, the keypoints selection module 234 selects two-pair matches between the target side surface and the image. Each pair in the two-pair match includes a selected keypoint from the target side surface and one of its matched keypoint in the query image. In certain embodiments, the keypoint selection module 234 select two keypoints from the target side surface. The selection is random after meeting certain requirements. The requirements include that the two keypoints in the target side surface should be far enough, such as more than five pixels apart; and each of the two keypoints should have at least one matched keypoints in the image. Because each selected keypoint in the target side surface may have more than one matched keypoint in the image, the keypoint selection module 234 may form more than one two-pair matches, or multiple set of two-pair matches. After that, the keypoint selection module 234 sends the multiple sets of two-pair matches to the bounding box module 236. In certain embodiments, when the distance between the two selected keypoints in the template and the distance between the two matched keypoints in the query image have large difference, the two-pair matches are removed from consideration.

At procedure 418, upon receiving a set of two-pair matches, the bounding box module 236 determines a bounding box for each two-pair keypoints matches, and send the bounding boxes to the inlier checking module 238. Each set of the two-pair keypoint matches include two keypoints in the target side surface of the template and two matched keypoints in the image. The two keypoints are located in the same side of the template and the four corners points of that side is clearly defined in the template. When the two corresponding keypoints in the query image are available, the four corner points in the query image can also be determined based on the template. The four determined corner points in the query image defines the bounding box. During the calculation of the bounding box, a transformation matrix between the query image and the template is obtained.

At procedure 420, upon receiving the determined bounding boxes and its transformation matrix, the inlier checking module 238 finds out all the keypoints in the bounding box that have matched keypoints in the template, to determine the inliers, and sends the bounding box with inliers to the bounding box refining module 240. In certain embodiments, after determining the matched keypoints between the keypoints in the bounding box and the matched keypoints in the side of the template, the inlier checking module 238 projects the matched keypoints in the query image using the transformation matrix to the template to obtain projected positions, and compare the projected position with the position of the matched keypoints in the template. When the difference between the two positions are small, the keypoints in the query image is defined as an inlier. For all the matched keypoints in the bounding box, the inlier checking module 238 calculate a percentage of the inlier keypoints relative to all the matched keypoints in the bounding box. If a significant percentage of the matched keypoints are inliers, the two-pair keypoint matches are considered good candidate of real match, and regarded as one of the results in the region of interest. In certain embodiments, the percentage is set at about 60%. That is, if the rate between tin inlier keypoints in the bounding box and the matched keypoints between the bounding box keypoints and the keypoints in the side of the template is greater than 60%, the bounding box is valid. The inlier checking module 238 then sends the bounding box to the bounding box refining module 240 when the bounding box has high percentage of matched keypoints, or discard the bounding box when the bound box has low percentage of matched keypoints.

At procedure 422, upon receiving each bounding box and the inliers, the bounding box refining module 240 refines the bounding box using the inliers. In certain embodiments, the refinement is performed by calculating a homography using all the inliers. When there are big difference between the bounding boxes before and after refinement, the bounding box before the refinement is used, and the confidence of the bounding box is defined as low. In certain embodiments, the homography scale X and Y axis are also checked. In certain embodiments, the bounding box refining module 240 compares the bounding box difference before and after refinement by check the change of the scales as described above. Each of the side edges (for example for a square shape, fours side edges are available) of the bounding box in the query has a length, the corresponding side edges of the side surface of the template has a length, the former length is divided by the latter length to obtain a scale, and if the scale is form about 0.8-1.25, the refinement is regarded as good. If not, the refinement is regarded as failed, and the bounding box before the refinement is maintained.

In certain embodiments, the bounding box refining module 240 receives multiple bounding boxes from the inlier checking module 238, and performs the refinement of the bounding boxes in different threads. In certain embodiments, the bounding box refining module 240 may also compare the refined bounding box to the other refined bounding boxes, and if there are huge overlap between two refined bounding boxes, the bounding box refining module 240 keeps only one bounding boxes from the two overlapped bounding boxes which has a higher confidence. After refinement, the bounding box refining module 240 sends the refined bounding boxes to the loop checking module 240.

At procedure 424, upon receiving those refined bounding boxes, the loop checking module 232 checks the number of iterations performed. When the loop checking module 232 determines that the iteration threshold is not met, it initiate a new iteration based on the weight of the side surfaces. When the loop checking module 232 determines that the iteration threshold is met, it selects one or more of the bounding boxes as the final result based on the quality of the bounding boxes, and finishes the application by using that bounding box to calculate pose of the object, and send the pose of the object to the robotic device 270. In certain embodiments, the selection of one bounding box is performed by comparing the confidence value of the bounding boxes and choosing the one with the highest confidence value.

Figure 5A:
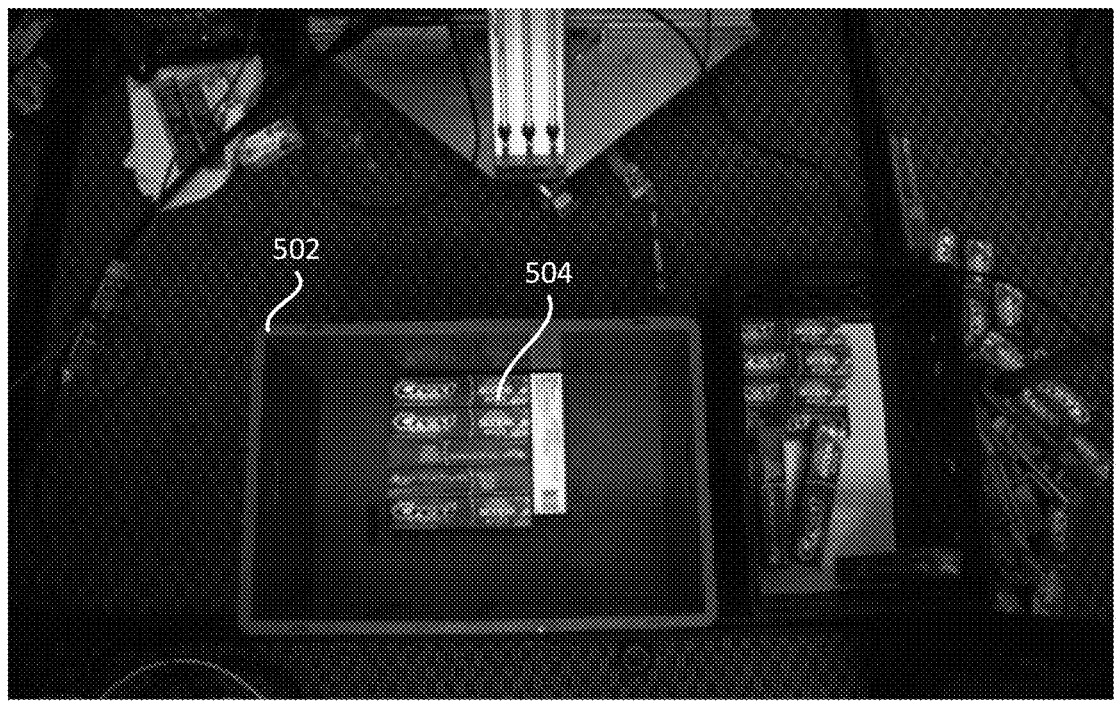
FIG. 5A schematically depicts an image having multiple object according to certain embodiments of the present disclosure.

FIGS. 5A-5I schematically shows an example according to certain embodiments of the disclosure. As shown in FIG. 5A, an image is provided. The region of interest is located in a bin 502, which contains several SKU items 504, here toothpaste packages.

Figure 5B:
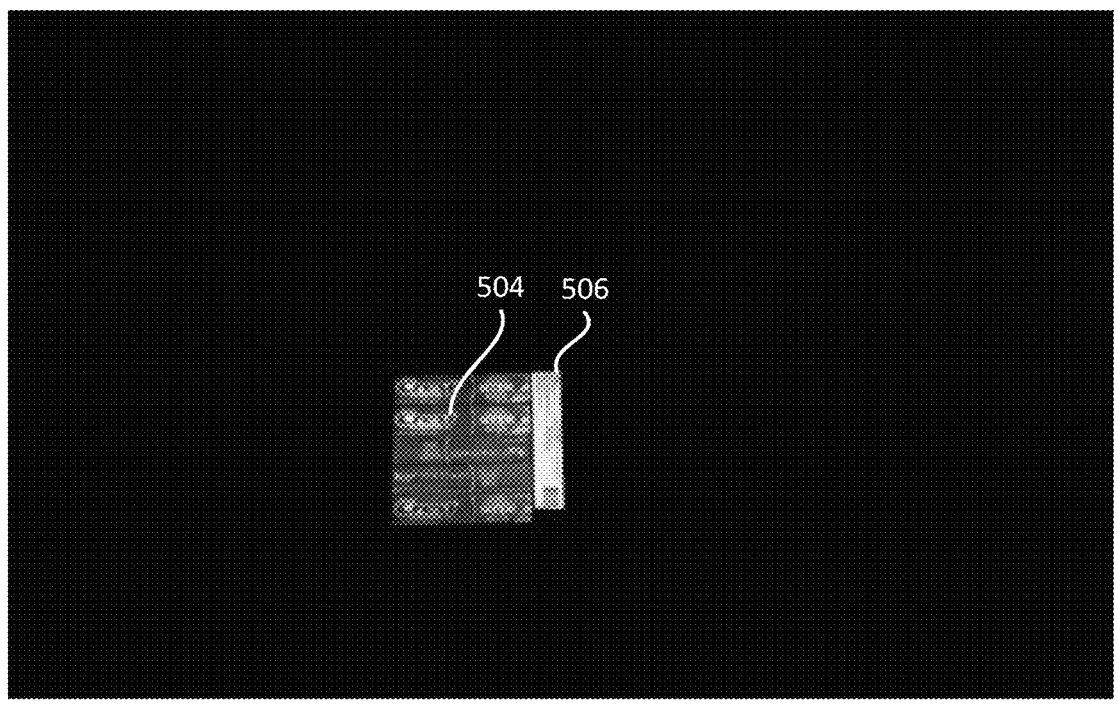
FIG. 5B schematically depicts a masked image of FIG. 5A.
Figure 5C:
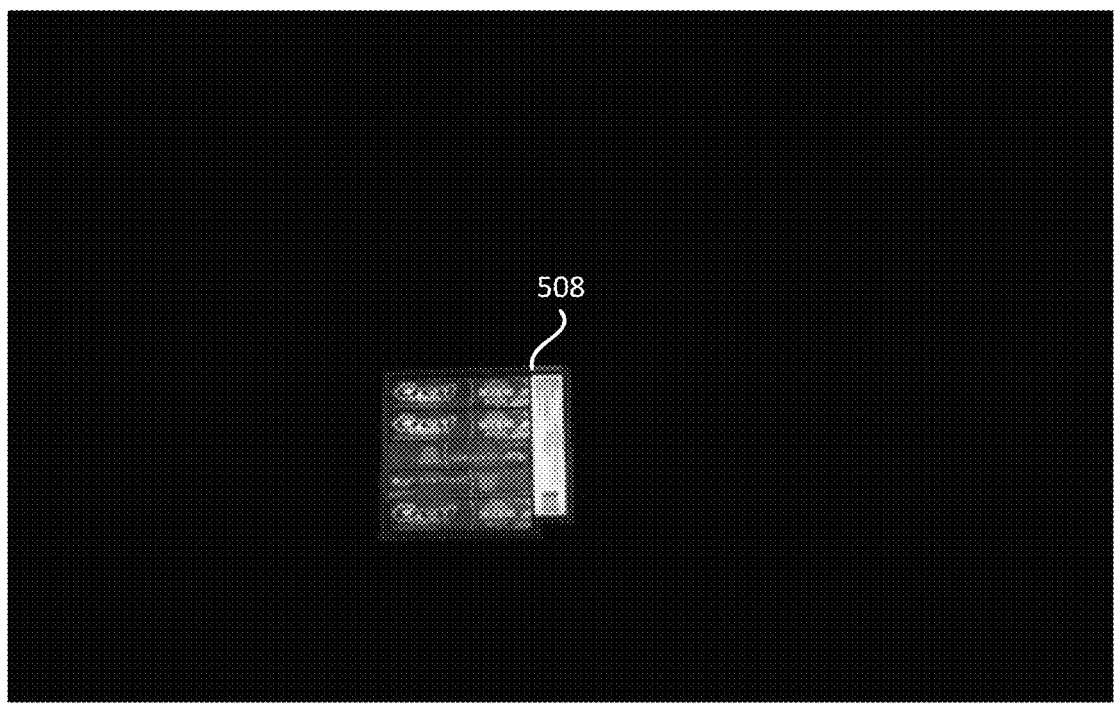
FIG. 5C schematically depicts a dilated masked image of FIG. 5B.

As shown in FIG. 5B, a mask 506 is placed on the image, so that only the toothpaste packages 504 are highlighted. After the masking of the region of interest, as shown in FIG. 5C, the mask is enlarged a little bit to form the enlarged mask 508.

Figure 5D:
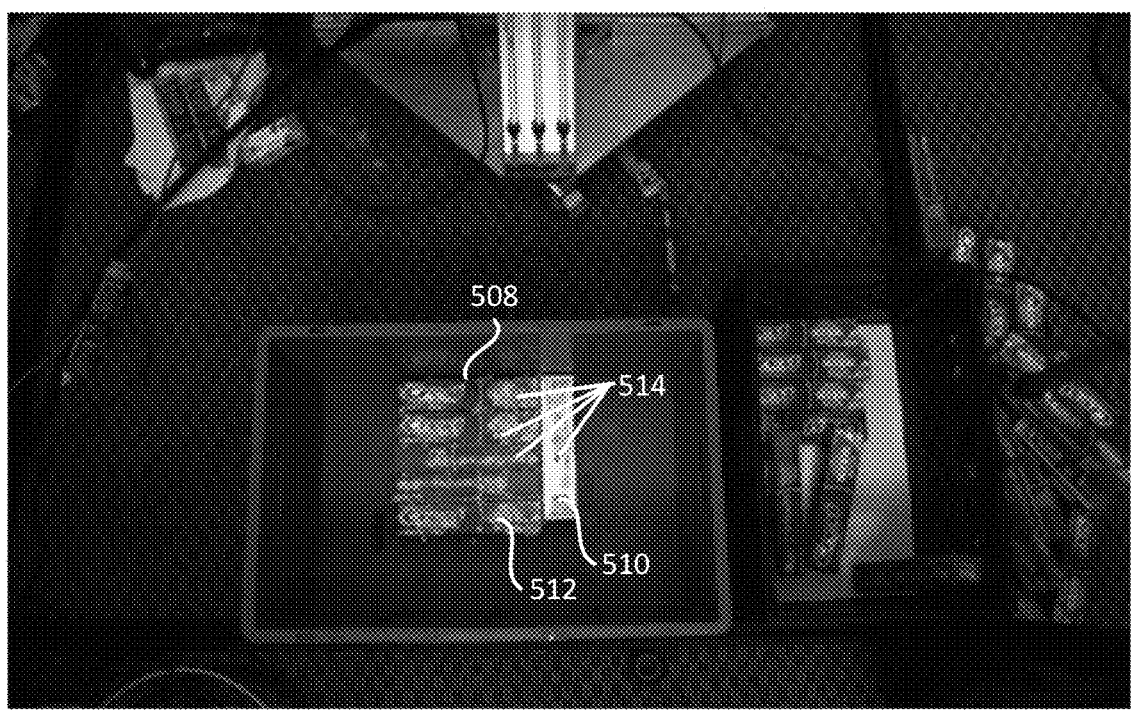
FIG. 5D schematically depicts detected keypoints in the area of the dilated masked image of FIG. 5C.

Then as shown in FIG. 5D, the enlarged mask 508 includes the SKU items 504 showing different side surfaces, for example, a side surface 510 of one of the SKU items 504 and a side surface 512 of another one of the SKU items 504. The side surfaces of the SKU items 504 are processed to obtain keypoints and features 514.

Figure 5E:
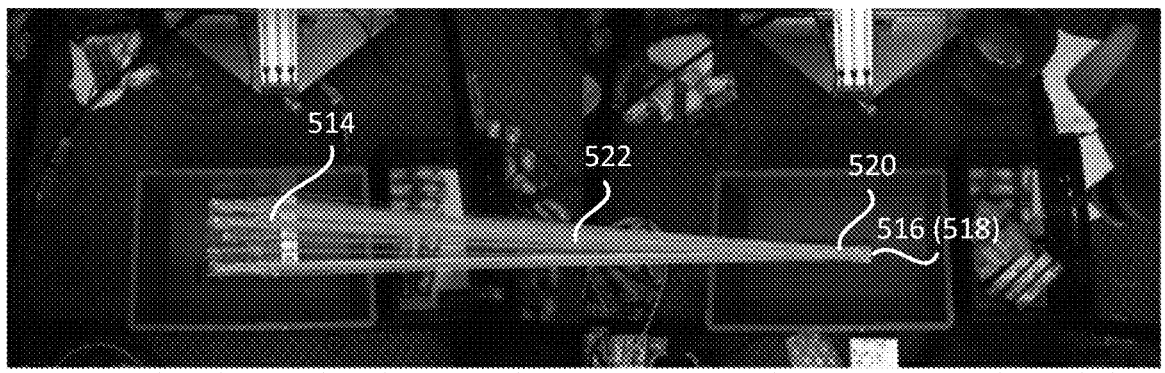
FIG. 5E schematically depicts matching of the keypoints between the keypoints in the image and the keypoint in one surface of the template according to certain embodiments of the present disclosure.
Figure 5F:
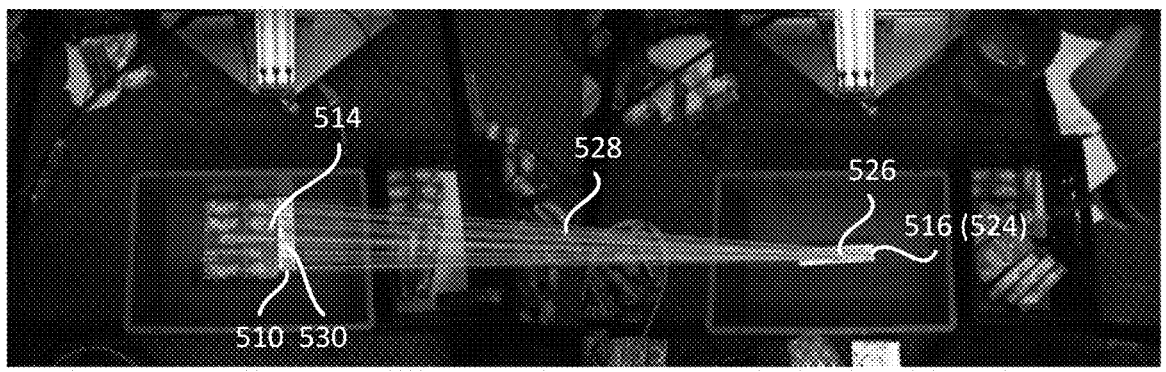
FIG. 5F schematically depicts matching of the keypoints between the keypoints in the image and the keypoint in the other one surface of the template according to certain embodiments of the present disclosure.

When the keypoints and features 514 are available for the SKU items 504, as shown in FIG. 5E and FIG. 5F, the keypoints 514 are matched to keypoints and features on different side surfaces of the template. As shown in FIG. 5E, the template SKU item 516 is shown with one side surface 518 facing upward, and the side surface 518 has keypoints and features 520. The keypoints and features 520 are matched to the keypoints and features 514 for the SKU items 504. The matched keypoints are connected by lines 522 for illustrative purpose. As shown in FIG. 5E, the template SKU item 516 is shown with another side surface 524 facing upward, and the side surface 524 has keypoints and features 526. The keypoints and features 526 are matched to the keypoints and features 514 for the SKU items 504. The matched keypoints are connected by lines 528 for illustrative purpose. The side surface 524 of the template 526 is matched well with the side surface 510.

Figure 5G:
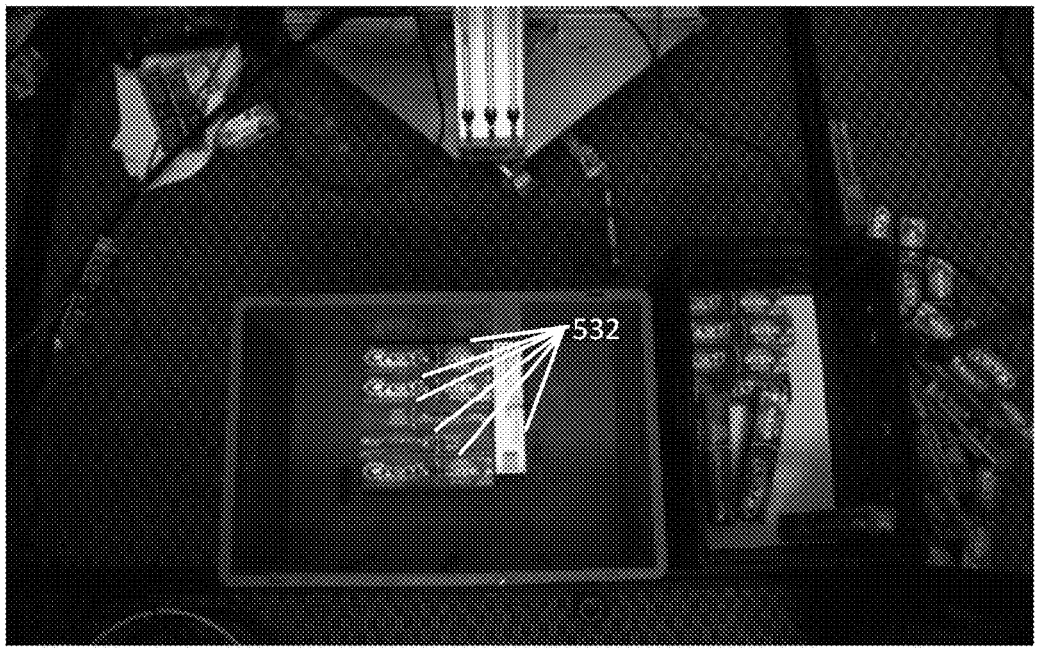
FIG. 5G schematically depicts refined bounding boxes of objects in the image according to certain embodiments of the present disclosure.

Then the system calculates and refines bounding boxes based on the keypoint match, where for example, inlier keypoints 530 can be determined from the side surface 510, and as a result shown in FIG. 5G, bounding box 532 for each of the SKU item in the image is obtained.

Figure 5H:
FIG. 5H schematically depicts a bounding box of an object from an image having multiple objects according to certain embodiments of the present disclosure, where the bounding box is before refinement.
Figure 5I:
FIG. 5I schematically depicts a bounding box of an object from an image having multiple objects according to certain embodiments of the present disclosure, where the bounding box is after refinement.

Further, FIG. 5H and FIG. 5I show an example of bounding box refinement, where for one SKU item 532, FIG. 5H shows the bounding box 534 before the refinement, and FIG. 5I shows the bounding box 534' after refinement. The bounding box 534 for the SKU item 532 intrudes to image of a neighboring item before the refinement, and after the refinement, the bounding box 534' is more accurate and does not intrude to the image of the neighboring item.

In summary, certain embodiments of the present disclosure provide systems and methods for fast and accurate detection of objects. The novel feature of the embodiments at least include using two keypoint pairs between the image and the template of the objects to define a bounding box, and refining the bounding box with other matched keypoints within the bounding box. With the detected pose of the objects available, robotic devices can manipulate those objects conveniently.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for determining a pose of a target object from a plurality of objects, the system comprising a computing device and a visual sensor in communication with the computing device, the computing device comprising a processor and a storage device storing computer executable code, wherein the computer executable code, when executed at the processor, is configured to:
   extract first keypoints from an image, wherein the image is captured by the visual sensor on a region of interest, the region of interest comprises the plurality of objects, and each of the first keypoints is defined with its location and feature descriptor;
   retrieve a template of the target object, wherein the template is obtained by recording image features of each of a plurality of side surfaces of the target object, the template comprises a plurality of template side surfaces corresponding to the plurality of side surfaces of the target object respectively, each of the template side surfaces is characterized with a plurality of second keypoints, and each of the second keypoints is defined with its location and feature descriptor;
   match the first keypoints to the second keypoints in each of the template side surfaces;
   select one of the template side surfaces having a greatest number of matches between the first keypoints and the second keypoints in the one of the template side surfaces;
   pick two second keypoints from the selected template side surface and determine two first keypoints respectively matching the two picked second keypoints;
   build a bounding box based on the two determined first keypoints, wherein the bounding box represents an image side surface corresponding to the selected template side surface of the template;
   determine inlier keypoints, wherein the inlier keypoints are located inside the bounding box, and have matched second keypoints in the selected template side surface;
   refine the bounding box using the inlier keypoints, wherein the pose of the target object is determined based on the refined bounding box.

2. The system of claim 1, wherein the computer executable code is configured to define a mask to the objects in the image before extracting first keypoints.

3. The system of claim 1, wherein the computer executable code is configured to pick two second keypoints from the selected template side surface iteratively for a pre-determined number of times.

4. The system of claim 3, wherein each of the template side surface is selected for a percentage of the pre-determined number of times, and the percentage is determined by a number of matched keypoints in the selected template side surface divided by a total number of matched keypoints in all the template side surfaces.

5. The system of claim 1, wherein the two picked second keypoints are at least 5 pixels apart, and each of the two picked second keypoints has a match with one of the first keypoints.

6. The system of claim 1,
   wherein the two second keypoints are selected randomly from the selected template side surface;
   wherein the computer executable code is configured to perform the step of picking two second keypoints, determining two matched first keypoints, building the bounding box, determining inlier keypoints, and refining the bounding box iteratively; and
   wherein each iteration results in a refined bounding box, each of the refined bounding boxes is characterized with a confidence value based on a number of inlier keypoints and a difference before and after the refinement, and the bounding box having a highest confidence value is used to determine the pose of the target object.

7. The system of claim 6, wherein when the difference is defined as scale change between the bounding box and the side surface of the template, when a length of each side edge of the bounding box divided by a length of a corresponding side edge of the side surface of the template is out of a range of 0.8-1.25, the bounding box before the refinement is kept as the refined bounding box, and the confidence value of the refined bounding box is reduced.

8. The system of claim 1, wherein the pose of the target object is provided to a robotic device for manipulating the target object.

9. A system for detecting an object, the system comprising a computing device, the computing device comprising a processor and a storage device storing computer executable code, wherein the computer executable code, when executed at the processor, is configured to:
   provide first keypoints from an image of the object;
   retrieve a template of the object, wherein the template is obtained by recording image features of each of a plurality of side surfaces of the target object, the template comprises a plurality of template side surfaces corresponding to the plurality of side surfaces of the target object respectively, at least one template side surface of the object has a plurality of second keypoints;

select one of the template side surfaces having a greatest number of matched second keypoints and first keypoints;

pick two second keypoints from the selected template side surface and determine two first keypoints respectively matching the two picked second keypoints;

build a bounding box of the object based on the two determined first keypoints; and refine the bounding box to detect the object.

10. The system of claim 9, wherein each of the first keypoints and the second keypoints is characterized by a location and descriptor.

11. The system of claim 9, wherein the two picked second keypoints are picked randomly and the computer executable code is configured to perform the step of picking iteratively for a pre-determined times.

12. The system of claim 11, wherein the two picked second keypoints has a distance greater than a pre-determined distance, and each of the two picked second keypoints has a match with one of the first keypoints.

13. The system of claim 9, wherein the first keypoints in the bounding box having match with the second keypoints in the template side surface are defined as inlier keypoints, and the bounding box is refined using the inlier keypoints.

14. A method for detecting an object, the method comprising:

providing, by a computing device, first keypoints from an image of the object;

retrieving, by the computing device, a template of the object, wherein the template is obtained by recording image features of each of a plurality of side surfaces of the target object, the template comprises a plurality of template side surfaces corresponding to the plurality of side surfaces of the target object respectively, at least one template side surface has a plurality of second keypoints;

selecting, by the computing device, one of the template side surfaces having a greatest number of matched second keypoints and first keypoints;

picking, by the computing device, two second keypoints from the selected template side surface and determining two first keypoints respectively matching the two picked second keypoints;

building a bounding box of the object based on the two determined first keypoints; and refining the bounding box to detect the object.

15. The method of claim 14, wherein each of the first keypoints and the second keypoints is characterized by a location and descriptor.

16. The method of claim 14, wherein the two picked second keypoints are picked randomly, as long as the two picked second keypoints has a distance greater than a pre-determined distance and each of the two picked second keypoints has a match with one of the first keypoints.

17. The method of claim 14, wherein the first keypoints in the bounding box having match with the second keypoints in the template side surface are defined as inlier keypoints, and the bounding box is refined using the inlier keypoints.

* * * * *